Sept. 30, 1952        R. KURZWEIL        2,612,071
HYDRAULICALLY OPERATED HEADSTOCK CENTER
Filed June 5, 1948        3 Sheets-Sheet 1
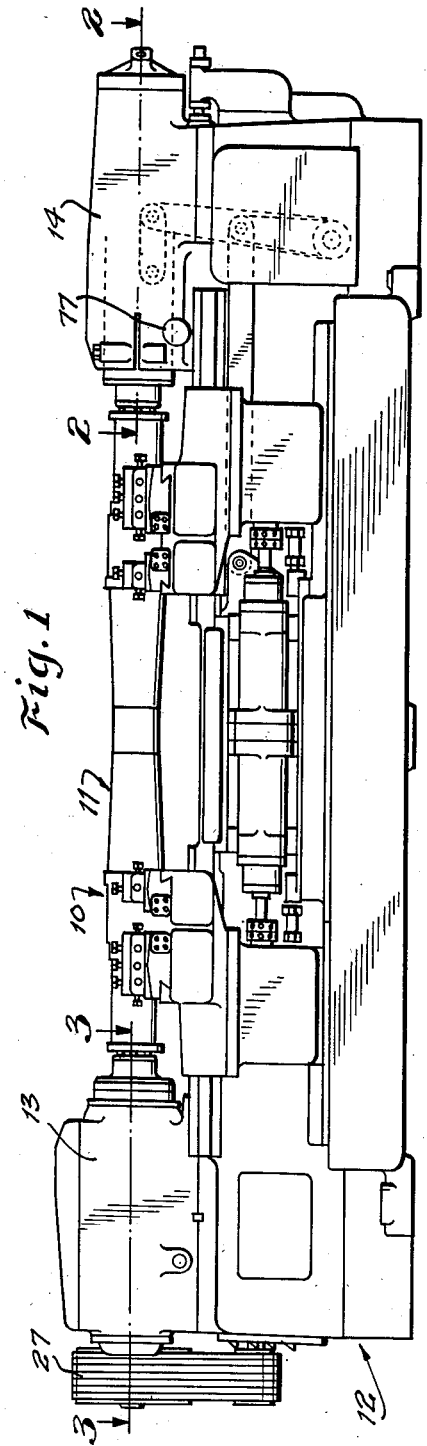
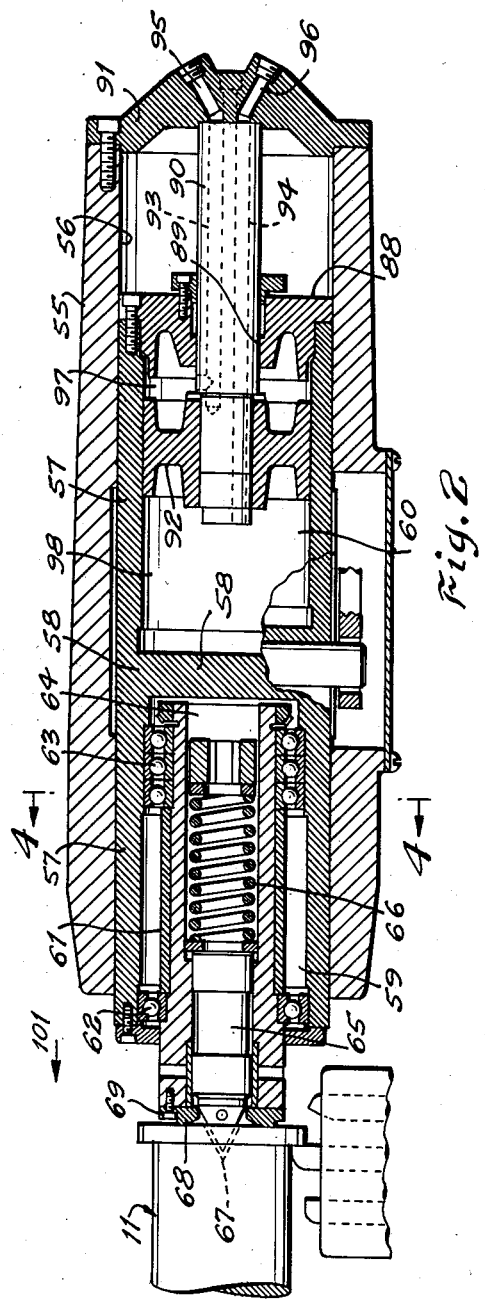
INVENTOR.
ROBERT KURZWEIL
BY

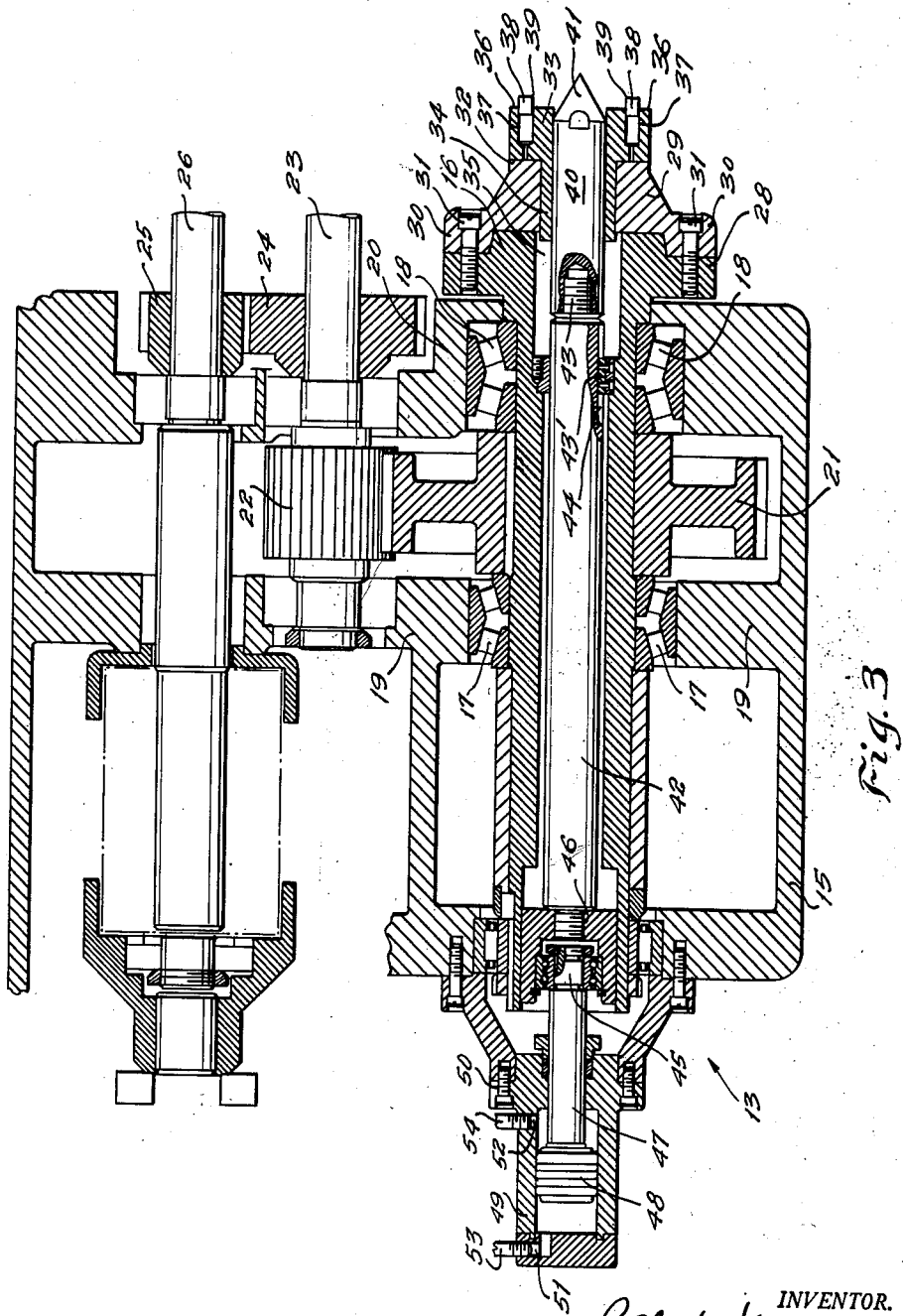

Sept. 30, 1952   R. KURZWEIL   2,612,071
HYDRAULICALLY OPERATED HEADSTOCK CENTER
Filed June 5, 1948   3 Sheets-Sheet 3

INVENTOR.
Robert Kurzweil
BY
[signature]

Patented Sept. 30, 1952

2,612,071

UNITED STATES PATENT OFFICE 2,612,071

HYDRAULICALLY OPERATED HEADSTOCK CENTER

Robert Kurzweil, Kew Gardens, N. Y., assignor to Morey Machinery Co. Inc., Long Island City, N. Y.

Application June 5, 1948, Serial No. 31,273

8 Claims. (Cl. 82—28)

The present invention relates to lathes, and more particularly to lathe headstocks.

It is an object of the present invention to provide a lathe headstock with means adapted to move the work piece in axial direction.

It is another object of the present invention to provide in a headstock means for moving the headstock center forward and away from the work piece.

It is a further object of the present invention to provide a combined headstock and tailstock arrangement facilitating removal of heavy work pieces after turning.

With the above objects in view, the present invention mainly consists of a lathe headstock comprising in combination a headstock body, a headstock spindle rotatably and non-slidably mounted within the headstock body, driving means on the headstock spindle for drivingly engaging one end of a work piece, a headstock center mounted within the headstock spindle slidably in axial direction thereof, and means for sliding the headstock center in axial direction of the headstock spindle relative thereto.

A preferred headstock of the above type includes a tubular headstock spindle; in this event, the means for rotating the work piece are arranged on the annular front face of the tubular headstock spindle, and the headstock center is arranged within the front portion of this spindle adapted to project beyond the annular front face thereof; furthermore, a draw rod is also arranged within the tubular spindle behind the headstock center and secured at its front end to the rear end of this headstock center, slidably together with the same; finally, means are provided which are adapted to engage the rear end of the draw rod and to slide the same together with the headstock center in axial direction of the headstock spindle.

The above mentioned means for moving the draw rod are preferably hydraulic means; they are preferably stationary and include a piston rod arranged slidably in direction of the axis of the draw rod, but not rotatably about this axis.

The front end of this piston rod is connected by motion transmitting means, e. g. a thrust bearing, with the rear end of the draw rod.

With an arrangement of the above type it is possible to rotate the work piece by the driving means provided on the front face of the headstock spindle and to properly center at the same time the work piece by the slidable headstock center.

Furthermore, it is possible to properly disengage the work piece from the gripping driving means during removal of the work piece after turning without damaging the contacting edges of the driving means.

The novel features which I consider characteristic for the present invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front elevational view of a lathe embodying the present invention;

Fig. 2 is a cross sectional view of the lathe tailstock forming part of the lathe shown in Fig. 1, taken on line 2—2 of Fig. 1;

Fig. 3 is a cross sectional view of the lathe headstock forming part of the lathe shown in Fig. 1, taken on line 3—3 of Fig. 1;

Figure 4:
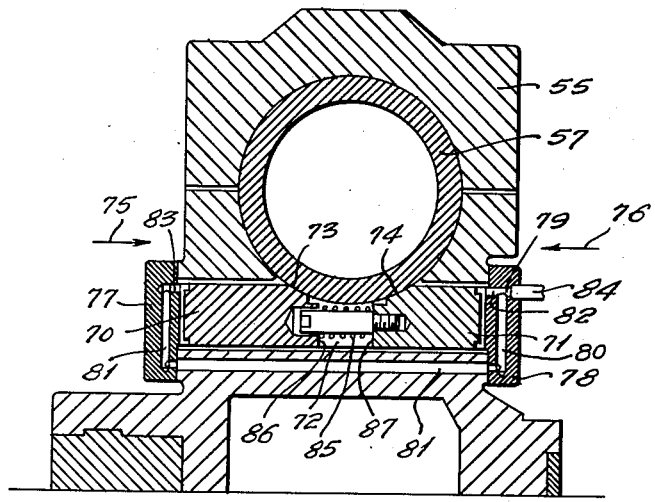
Fig. 4 is a cross section through the lathe tailstock shown in Fig. 2, taken on line 4—4 of Fig. 2.
Figure 5:
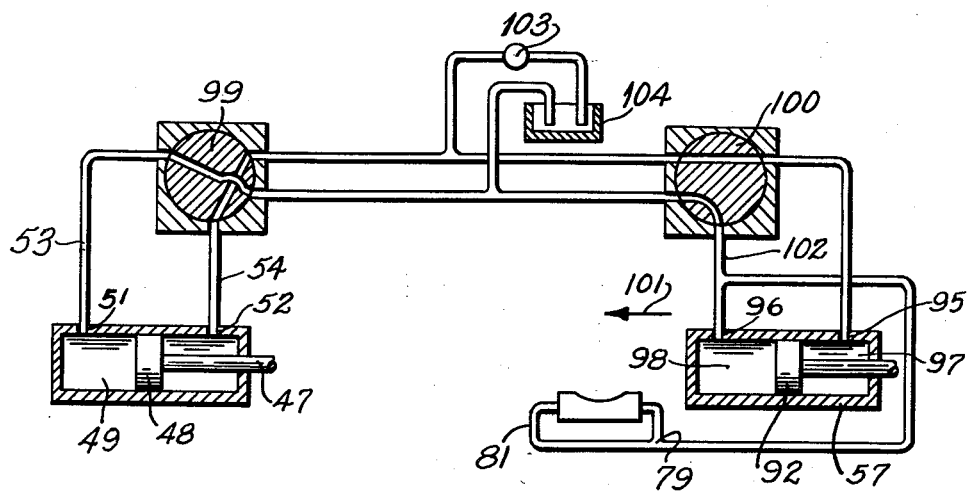
Fig. 5 is a schematic showing of the hydraulic means for operating the various parts of the headstock and the tailstock.

Referring now in detail to the drawings, 10 designates a lathe embodying the present invention. This lathe serves for turning a work piece, for instance a railroad axle or the like.

This lathe 10 is composed of a base 12, a headstock 13 and a tailstock 14.

The headstock 13 comprises, as clearly shown in Fig. 3, a headstock body 15 on which is mounted a hollow headstock spindle 16 supported by the roller bearing 17 and the front roller bearing 18. The roller bearing 17 is arranged in the rear wall 19 of the headstock body, whereas the roller bearing 18 is arranged in the front wall 20 thereof.

Fixed to the spindle 16 is a gear 21 meshing with the driving gear 22. This driving gear 22 is mounted on shaft 23. On this shaft 23, the gear 24 is mounted which engages gear 25 mounted on shaft 26. This shaft 26 is driven in any suitable manner, e. g. by means of a drive belt 27.

The spindle 16 is formed at its front end with an annular outwardly extending flange 28. In front of this annular flange 28, the nose 29 is arranged. This nose 29 is also provided with a flange 30 which is superimposed upon the front face of the annular flange 28 and secured to the same by means of screws 31. To the front face 32 of the nose 29, the annular ram ring 33 is secured by means of a plurality of screws not shown in the drawings.

This ram ring 33 is provided with a rearwardly projecting sleeve-shaped extension 34 reaching into the bore 35 of the tubular headstock spindle 16.

In the front face 36 of the ram ring 33 a plurality of holes 37 are provided. In each of these holes, a spur 38 is inserted. These spurs 38 are provided with gripping edges 39 and adapted to drivingly engage the work piece 11 when the same is in operative position.

In accordance with the present invention, a headstock center 40 is slidably supported by the sleeve-shaped extension 34 of the ram ring 33. This center 40 is provided at its front end in the usual manner with a conical piece 41 fitting into a corresponding centering hole on the work piece.

At its rear end, the center 40 is connected with the draw rod 42 by means of the screw 43. This draw rod is arranged slidably within the bore 35. Its turning within the tubular spindle 16 is, however, prevented by means of key 43' secured to the inner surface of the tubular spindle 16 projecting into the bore 35 and the corresponding key way 44 provided in the draw rod 42, as clearly shown in Fig. 3.

The combined thrust bearing 45 is secured by means of screw 46 to the rear end of the draw rod 42. This thrust bearing 45 is connected also to the piston rod 47 of the hydraulic piston 48 arranged within the hydraulic cylinder 49; this hydraulic cylinder 49 is secured, as clearly shown, by means of screw 50 to the rear wall 19 of the headstock body 15.

The hydraulic cylinder 49 is furthermore connected by the ports 51 and 52 with the conduits 53 and 54, respectively. These conduits 51 and 52 connect the cylinder with hydraulic operating means for admitting hydraulic fluid into the cylinder 49; this hydraulic fluid moves the piston 48 within the cylinder 49, as will be described farther below in detail.

The tailstock 14 mounted on the base 10 includes a tailstock body 55 provided with a cylindrical bore 56. Within this cylindrical bore 56 the tubular cylinder 57 is slidably arranged. This tubular cylinder 57 is subdivided by the partition wall 58 into a front compartment 59 and a rear compartment 60.

Within the front compartment 59 of cylinder 57 the quill 61 is freely rotatably supported by means of the roller bearings 62 and 63. This quill is non-slidable relative to the cylinder 57 but can be moved together with the same in axial direction of the tailstock body 55. The quill 61 is provided with the cylindrical bore 64; in this bore, the tailstock center 65 is arranged. This center 65 is permanently forced by spring 66 towards the work piece 11 so as to engage the center hole 67 provided in the same. On the front face of quill 61, the gripping projections 68 are provided. These gripping projections 68 are secured to the quill by means of screws 69.

In order to prevent sliding of the tubular cylinder 57 supporting the quill 61 in rearward direction while in operative position, i. e. while supporting the work piece, a lock of the type shown in Fig. 4 is provided. This lock consists of two cylindrical locking members 70 and 71 arranged in a cylindrical bore 72 within the tailstock body 55. These cylindrical locking members 70 and 71 are provided with locking faces 73 and 74, respectively. These locking faces 73 and 74 are arranged so as to firmly engage the outer surface of the tubular cylinder 57 when the cylindrical locking members 70 and 71 are moved in direction of arrows 75 and 76, respectively. In this engaging position of the cylindrical members, movement of the tubular cylinder 57 and quill 61 in axial direction is completely blocked.

In order to enable sliding of the two cylindrical locking members 70 and 71 in direction of arrows 75 and 76, respectively, the cylindrical bore 72 is closed at its ends by closure plates 77 and 78, and hydraulic conduits 79, 80, and 81 leading to the ports 82 and 83, respectively, are provided for admission of hydraulic pressure fluid. Such pressure fluid is introduced through the inlet conduit 84 and operates the lock as will be described farther below in detail.

It should be noted that the spring 85 arranged between the inner faces 86 and 87 of the cylindrical locking members 70 and 71, respectively, permanently forces these cylindrical locking members 70 and 71 apart from each other against direction of arrows 75 and 76.

The rear compartment 60 of cylinder 57 is closed at its end by the cap 88. This cap 88 is provided with a bore 89 through which the stationary piston rod 90 passes. This stationary piston rod 90 is secured at its rear end to the rear wall 91 of the tailstock body 55 and carries at its front end a stationary piston 92. Within this piston rod 90, the two conduits 93 and 94 are arranged; they connect the ports 95 and 96 with the space 97 behind the stationary piston 92 and the space 98 in front of the piston 92, respectively.

During chucking and removal of the work piece from the lathe, the above described arrangement operates as follows:

During chucking, the work piece, e. g. railroad axle 11, is lifted by separate lifting means, not shown in the drawings, between the headstock 13 and the tailstock 14 with its centering holes properly aligned between the headstock center 41 and the tailstock center 65.

When the work piece 11 is in this position, pressure fluid is admitted by the four-way distributing valve 99 through the port 51 into the hydraulic cylinder 49 on the headstock 13, forcing the piston 48 together with the draw rod 42 and center 41 towards the work piece. This will result in engagement of the headstock center 41 and the corresponding center hole of the work piece 11, and center 41 will slide the work piece—while supported by the above mentioned lifting means—towards the tailstock 14 into contact with the tailstock center 65 and the gripping projections 68 of the retracted quill 61.

At this moment, pressure fluid is admitted by means of the distributing valve 100 and port 96 into the conduit 94 and through the same into the space 98 in front of the stationary piston 92, forcing the freely slidable cylinder 57 together with the quill 61 and the spring pressed center 65 in direction of arrow 101. During the movement, the spring pressed center 65 will engage the corresponding center hole 67 of the work piece, properly centering the same, and the gripping projections 68 will force the work piece against action of the hydraulic means provided in the headstock 13 in direction of arrow 101 towards the headstock.

I wish to note that this action is possible not due to a difference in line pressure within the various hydraulic conduits but due to the difference in the pressure faces of the pistons 92 and 48: Due to the face that the pressure face of piston 92 is substantially larger than the pressure face of piston 48, the actual total pressure exerted by quill 61 will be substantially larger than the pressure exerted by center 41, and, therefore, it will be possible for quill 61 to move the work piece against action of piston 48 in direction of arrow 101. This movement will continue until the work piece engages the gripping edges 39 of the spurs 38, firmly pressed against the same.

During this period, the pressure of the pressure fluid admitted through the common conduit 102 to the port 96 for moving cylinder 57 and through the conduit 79 to the port 82 of the locking mechanism shown in Fig. 4 will be insufficient to operate the locking mechanism, i. e. to slide the locking cylinders 70 and 71 against action of spring 85. However, the moment the cylinder 57 reaches its forward position and is in standstill, the pressure in conduit 102 will greatly increase so as to overcome the pressure of spring 85 and to move the locking members 73 and 74 into engagement with cylinder 57, firmly locking the same in its forward operative position.

The line pressure is maintained during turning operation.

When, after turning, it is desired to move the work piece, the following procedure is followed:

While the pressure is maintained in conduit 53, the valve 100 is turned so as to connect the conduit 102 with an outlet conduit leading to tank 104 and to simultaneously connect port 95 with a pressure conduit including pump 103. Thereby hydraulic pressure fluid is forced into the space 97 behind the stationary piston 92, moving the cylinder 57 together with quill 61 and center 65 against direction of arrow 101. During this movement, disengagement of the tailstock center 65 from the work piece 11 is prevented by the fact that the work piece will be forced by the headstock center 41—which is under pressure of the piston 48—to follow the tailstock center 65 in its movement against direction of arrow 101 away from the spurs 38 of the headstock, safely disengaging the same from the work piece.

When the cylinder 57 reaches its utmost retracted position, valve 99 is automatically operated e. g. by a pre-set electric switch which actuates a solenoid shifting valve 99 so as to connect the conduit 54 and port 52 with a pressure line, thereby retracting the headstock center 41 and moving it out of engagement with the corresponding center hole of the work piece, thus safely depositing this work piece on the lifting means moved in the meantime under the work piece.

It will be understood that each of the elements described above, or two or more together, may also find a useful application in other types of metal working machines differing from the types described above.

While I have illustrated and described the invention as embodied in lathes for turning heavy work pieces, I do not intend to be limited to the details shown, since various modifications and structural changes may be made without departing in any way from the spirit of this invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A lathe headstock comprising, in combination, a headstock body; a tubular headstock spindle rotatably and non-slidably mounted within said headstock body; driving means on the annular front face of said tubular headstock spindle for drivingly engaging a work piece; a rotatable headstock center mounted within said headstock spindle for rotation with said headstock spindle, but slidably in axial direction thereof; non-rotatable hydraulic means mounted on said headstock body for sliding said rotatable headstock center in axial direction of said headstock spindle relative thereto; and bearing means arranged between said non-rotatable hydraulic means and said rotatable headstock center so as to enable rotation of said rotatable headstock center together with said headstock spindle while moved in axial direction by said non-rotatable hydraulic means.

2. A lathe headstock comprising, in combination, a headstock body; a tubular headstock spindle rotatably and non-slidably mounted within said headstock body; driving means on the annular front face of said tubular headstock spindle for drivingly engaging a work piece, said driving means including a flanged member secured to said tubular headstock spindle, a ram ring provided with a plurality of holes in its front face and with a sleeve-shaped extension rearwardly projecting into the bore of said tubular headstock spindle, and a plurality of gripping members mounted in said holes in said front face of said ram ring and adapted to engage the adjacent face of the work piece for rotation of the same; a rotatable headstock center mounted within said headstock spindle for rotation with said headstock spindle, but slidably in axial direction thereof; non-rotatable hydraulic means mounted on said headstock body for sliding said rotatable headstock center in axial direction of said headstock spindle relative thereto; and bearing means arranged between said non-rotatable hydraulic means and said rotatable headstock center so as to enable rotation of said rotatable headstock center together with said headstock spindle while moved in axial direction by said non-rotatable hydraulic means.

3. A lathe headstock comprising, in combination, a headstock body; a tubular headstock spindle rotatably and non-slidably mounted within said headstock body; driving means on the annular front face of said tubular headstock spindle for drivingly engaging a work piece, said driving means including a flanged member secured to said tubular headstock spindle, a ram ring provided with a plurality of holes in its front face and with a sleeve-shaped extension rearwardly projecting into the bore of said tubular headstock spindle, and a plurality of gripping members mounted in said holes in said front face of said ram ring and adapted to engage the adjacent face of the work piece for rotation of the same; a rotatable headstock center mounted within said headstock spindle for rotation with said headstock spindle, but slidably in axial direction thereof; non-rotatable hydraulic means including a cylinder member, and a piston member arranged slidably within said cylinder member, one of said members firmly mounted on said headstock body and the other serving for sliding said rotatable headstock center in axial direction of said headstock spindle relative thereto; and bearing means interposed between said other member of said non-rotatable hydraulic means and said rotatable headstock center so as to enable rotation of said rotatable headstock center while moved in axial direction by said other member of said non-rotatable hydraulic means.

4. A lathe headstock comprising, in combination, a headstock body; a tubular headstock spindle rotatably and non-slidably mounted within said headstock body; driving means on the annular front face of said tubular headstock spindle for drivingly engaging a work piece, said driving means including a flanged member secured to said tubular headstock spindle, a ram ring provided with a plurality of holes in its front face and with a sleeve-shaped extension rearwardly projecting into the bore of said tubular headstock spindle, and a plurality of gripping members mounted in said holes in said front face of said ram ring and adapted to engage the adjacent face of the work piece for rotation of the same; a rotatable headstock center mounted within said headstock spindle for rotation with said headstock spindle, but slidably in axial direction thereof; non-rotatable hydraulic means including a cylinder member, and a piston member arranged slidably within said cylinder member, one of said members firmly mounted on said headstock body and the other serving for sliding said rotatable headstock center in axial direction of said headstock spindle relative thereto; and roller bearing means including two parts being turnable relative to each other, one of said parts secured to said other member of said hydraulic means, and the other of said parts secured to said rotatable headstock center so as to permit rotation of said rotatable headstock center while moved in axial direction by said other member of said non-rotatable hydraulic means.

5. A lathe headstock comprising, in combination, a headstock body; a tubular headstock spindle rotatably and non-slidably mounted within said headstock body; driving means on the annular front face of said tubular headstock spindle for drivingly engaging a work piece; a rotatable headstock center mounted within said headstock spindle for rotation with said headstock spindle, but slidably in axial direction thereof; non-rotatable hydraulic means including a cylinder member, and a piston member arranged slidably within said cylinder member, one of said members firmly mounted on said headstock body and the other serving for sliding said rotatable headstock center in axial direction of said headstock spindle relative thereto; and bearing means interposed between said other member of said non-rotatable hydraulic means and of said rotatable headstock center so as to enable rotation of said rotatable headstock center while moved in axial direction by said other member of said non-rotatable hydraulic means.

6. A lathe headstock comprising, in combination, a headstock body; a tubular headstock spindle rotatably and non-slidably mounted within said headstock body; driving means on the annular front face of said tubular headstock spindle for drivingly engaging a work piece; a rotatable headstock center mounted within said headstock spindle for rotation with said headstock spindle, but slidably in axial direction thereof; non-rotatable hydraulic means including a cylinder member and a piston arranged slidably within said cylinder member, one of said members firmly mounted on said headstock body and the other serving for sliding said rotatable headstock center in axial direction of said headstock spindle relative thereto; and roller bearing means including two parts being turnable relative to each other, one of said parts secured to said other member of said hydraulic means, and the other of said parts secured to said rotatable headstock center so as to permit rotation of said rotatable headstock center while moved in axial direction by said other member of said non-rotatable hydraulic means.

7. A lathe headstock comprising, in combination, a headstock body; a tubular headstock spindle rotatably and non-slidably mounted within said headstock body; driving means on the annular front face of said tubular headstock spindle for drivingly engaging a work piece; a rotatable headstock center mounted within said headstock spindle for rotation with said headstock spindle, but slidably in axial direction thereof; a draw rod arranged within said tubular headstock spindle mounted slidably within the same in axial direction but non-rotatably relative to it; means securing the front end of said draw rod to the rear end of said headstock center; non-rotatable hydraulic means mounted on said headstock body for sliding said draw rod together with said rotatable headstock center in axial direction of said headstock spindle relative thereto; and bearing means arranged between said non-rotatable hydraulic means and said rotatable headstock center so as to enable rotation of said rotatable headstock center together with said headstock spindle while moved in axial direction by said non-rotatable hydraulic means.

8. A lathe headstock comprising, in combination, a headstock body; a tubular headstock spindle rotatably and non-slidably mounted within said headstock body; driving means on the annular front face of said tubular headstock spindle for drivingly engaging a work piece; a rotatable headstock center mounted within said headstock spindle for rotation with said headstock spindle, but slidably in axial direction thereof; a draw rod arranged within the same in axial direction but non-rotatably relative to it; means securing the front end of said draw rod to the rear end of said headstock center; non-rotatable hydraulic means including a cylinder member, and a piston member arranged slidably within said cylinder member, one of said members firmly mounted on said headstock body and the other serving for sliding said draw rod in axial direction of said headstock spindle relative thereto; and bearing means interposed between said other member of said non-rotatable hydraulic means and said draw rod so as to enable rotation of said rotatable headstock center while moved in axial direction by said other member of said non-rotatable hydraulic means.

ROBERT KURZWEIL.

REFERENCES CITED

The following references are of record in the file of this patent:

UNITED STATES PATENTS

| Number | Name | Date |
|---|---|---|
| 1,700,837 | Fisher | Feb. 5, 1929 |
| 1,914,984 | Smith | June 20, 1933 |
| 1,950,040 | Smith | Mar. 6, 1934 |
| 1,970,023 | Schroeder | Aug. 14, 1934 |
| 2,117,960 | Indge | May 17, 1938 |
| 2,191,137 | Trible | Feb. 20, 1940 |
| 2,279,730 | Bradley | Apr. 14, 1942 |
| 2,389,746 | Sparks | Nov. 27, 1945 |
| 2,415,181 | Johnson | Feb. 4, 1947 |
| 2,435,451 | Tourneau et al. | Feb. 3, 1948 |
| 2,545,852 | Kurzweil et al. | Mar. 20, 1951 |